United States Patent [19]

Pollock et al.

[11] Patent Number: 5,084,253

[45] Date of Patent: Jan. 28, 1992

[54] METHOD OF REMOVING NIOBIUM FROM URANIUM-NIOBIUM ALLOY

[75] Inventors: Eugene N. Pollock, Brookline; David S. Schlier, Gardner; George Shinopulos, Burlington, all of Mass.

[73] Assignee: Nuclear Metals, Inc., Concord, Mass.

[21] Appl. No.: 455,975

[22] Filed: Nov. 13, 1989

[51] Int. Cl.$^5$ .................... C01G 33/00; C22B 34/20
[52] U.S. Cl. .................... 423/65; 423/18; 423/20; 423/68; 423/592; 75/353
[58] Field of Search .................. 423/8, 11, 12, 16, 18, 423/20, 62, 63, 65, 26, 68, 592; 75/394, 398, 353; 210/682

[56] References Cited

U.S. PATENT DOCUMENTS

| 4,446,116 | 5/1984 | Krismer et al. | 423/63 |
| 4,451,438 | 5/1984 | Floeter et al. | 423/20 |
| 4,699,769 | 10/1987 | Pollock | 423/20 |
| 4,837,375 | 6/1989 | Pollock | 423/20 |

Primary Examiner—Brooks H. Hunt
Assistant Examiner—Ngoclan T. Mai
Attorney, Agent, or Firm—Joseph S. Iandiorio

[57] ABSTRACT

A method of removing niobium from a uranium-niobium alloy includes dissolving the uranium-niobium alloy metal pieces in a first aqueous solution containing an acid selected from a group consisting of HCl and $H_2SO_4$ and a fluoboric acid as a catalyst to provide a second aqueous solution which includes uranium ($U^{+4}$), acid radical ions, the acids and insolubles including uranium oxides and niobium oxides; adding nitric acid to the insolubles to complete the oxidation of the niobium oxides to yield niobic acid and further solubilizing thr uranium oxide; and separating the niobic acid, nitric acid and solubilized uranium oxides.

9 Claims, 2 Drawing Sheets

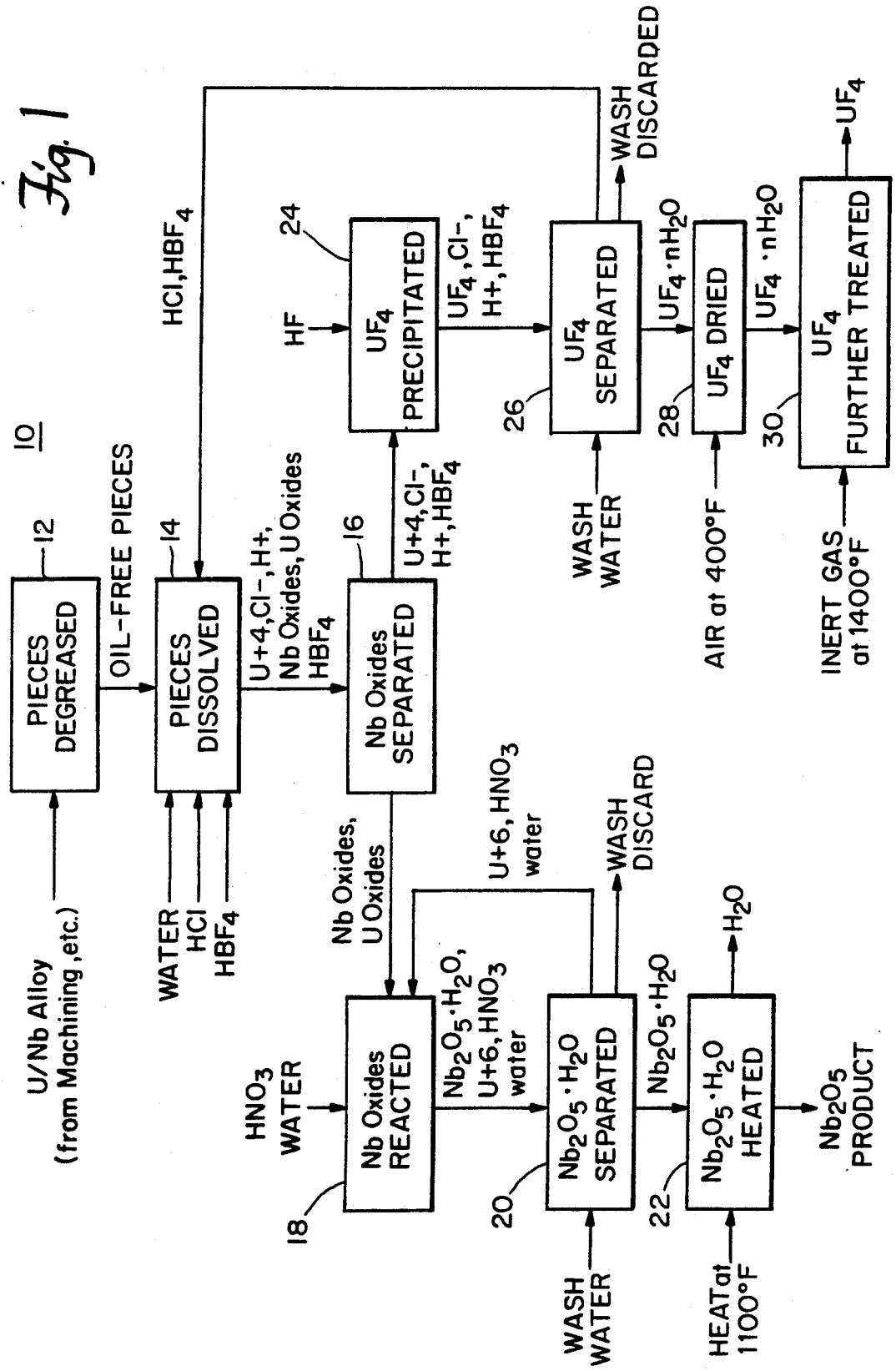

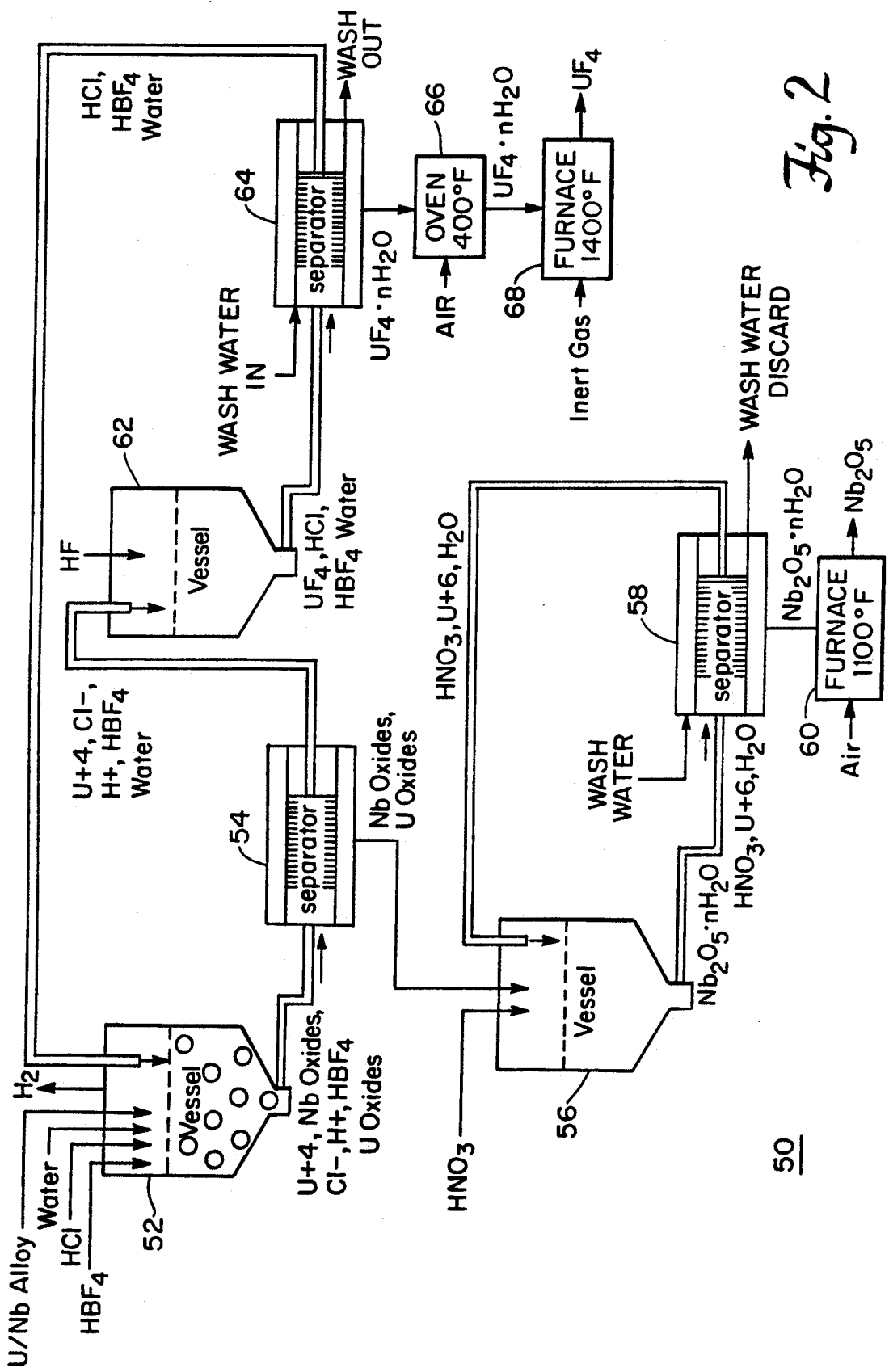

METHOD OF REMOVING NIOBIUM FROM URANIUM-NIOBIUM ALLOY

FIELD OF INVENTION

This invention relates to a method of removing niobium from a uranium-niobium alloy, and more particularly to such a method which separates both niobium oxides and uranium tetrafluoride from the uranium-niobium alloy.

BACKGROUND OF INVENTION

Certain fabrications using uranium products employ a uranium-niobium alloy. The uranium is actually depleted uranium: 99.8% $^{238}U$ and 0.2% $^{235}U$. Presently, depleted uranium requires burial in a special licensed site for low-level radioactive wastes. This form of disposal is expensive due to the loss of the niobium and to a lesser extent to the loss of uranium, and also due to the cost of operating the licensed burial site. There is a high cost associated with the burial of low-level radioactive waste. It has risen dramatically over the past several years to over $60 per cubic foot and forecasts indicate a future cost of as much as approximately $300 per cubic foot at certain sites. The uranium-niobium allow cannot be simply containerized or buried: it must first be treated and packaged so that it is non-leachable, non-corrosible and non-pyrophoric. The preferred method of meeting such problems in the past was to recycle the material that was uncontaminated by oxides and impurities. One attempt at recycling recovers the scrap by remelting it and reusing in the original process. But a substantial amount of the material is not amenable to remelting because it will suffer from contaminations from the manufacturing process, as well as oxidation during the manufacturing process. The material that cannot be recycled in the past may require burial by encapsulation.

SUMMARY OF INVENTION

It is therefore an object of this invention to provide a method of rapidly dissolving uranium-niobium alloys.

It is a further object of this invention to provide such a method which separates both the uranium and niobium components into usable materials of marketable quality.

It is a further object of this invention to provide such a method which dramatically reduces the amount of low-level radioactive waste from uranium-niobium alloy fabrication which must be buried in licensed sites.

It is a further object of this invention to provide such a method which reduces the cost of disposal and recovers valuable niobium and uranium for recycling.

This invention results from the realization that a fast, effective separation of niobium and uranium in a uranium/niobium alloy can be achieved by solubilizing the alloy and simultaneously precipitating niobium oxides which can be removed by filtration. The niobium oxides can be oxidized with nitric acid to insoluble niobic acid ($Nb_2O_5 \cdot H_2O$) and removed by filtration. The original filtrate containing solubilized uranium can be used to produce green salt by the addition of hydrofluoric acid.

This invention features a method of removing niobium from a uranium-niobium alloy, including dissolving the uranium-niobium alloy metal pieces in a first aqueous solution containing an acid selected from a group consisting of HCl and $H_2SO_4$ and fluoboric acid as a catalyst to provide a second aqueous solution which includes uranium ($U^{+4}$), acid radical ions, the acids and insolubles including uranium oxides and niobium oxides. Nitric acid is added to the insolubles to oxidize the niobium oxides to yield niobic acid and to complete the solubilization of any residual uranium. The niobic acid is separated from the nitric acid and the solubilized uranium.

In a preferred embodiment the niobic acid may be dried to obtain niobic pentoxide. The niobic acid may be dried at approximately 1100° F. The HCl or $H_2SO_4$ may be 3 normal (25%).

The fluoboric acid may have a concentration of 0.5–5 percent and the nitric acid concentration may be approximately 50%. The various separations may be accomplished by filtering, centrifuging or the like.

BRIEF DESCRIPTION OF THE DRAWINGS

Other objects, features and advantages will occur to those skilled in the art from the following description of a preferred embodiment and the accompanying drawings, in which:

FIG. 1 is a diagram of a method for separating niobium and uranium in a uranium-niobium alloy according to this invention; and FIG. 2 is an elevational partly schematic view of an apparatus for separating niobium and uranium in a uranium-niobium alloy according to this invention.

DISCLOSURE OF PREFERRED EMBODIMENT

Recovering niobium and uranium in a uranium-niobium alloy by separating the alloy into niobic acid (and then niobic pentoxide) and green salt or $UF_4$ is accomplished by dissolving pieces of uranium-niobium alloy in a first container holding a first aqueous solution which includes typically 25% or less hydrochloric acid. The pieces are usually chips, scraps, or fines formed from the machining or grinding of the alloy. Such pieces can be dissolved rapidly in hydrochloric acid having a concentration of 35% or stronger. However, such high concentrations make the dissolution difficult to control due to the exothermic nature of the reaction. Additionally, the metal produces a sludge of uranium suboxide which cannot be dissolved without the addition of an oxidizing agent such as nitric acid ($HNO_3$). The use of such an agent produces the undesirable uranyl ion ($UO_2^{+2}$) which does not permit the formation of green salt.

Accordingly, a small concentration (e.g., at least 0.5% but no more than 5%) of fluoboric acid ($HBF_4$) is included in an aqueous solution. The fluoboric acid limits the formation of the undesirable uranium suboxide sludge and acts as a catalyst to permit the rapid and controlled dissolution of the metal or metal alloy with a more dilute, e.g., 10–20%, concentration of hydrochloric acid. That is, the fluoboric acid prevents the formation of insoluble uranium sludge but does not prevent the formation of insoluble niobium oxides. The dissolution of the uranium-bearing pieces also liberates hydrogen ($H_2$) which is vented from the vicinity of the container.

This results in an aqueous solution containing HCl, $HBF_4$, $U^{+4}$, $CL^-$ and insolubles such as niobium oxides and undissolved uranium which is moved through a first separator for separating the niobium oxides from the aqueous solution. The insolubles are treated with nitric acid (up to 50%) to complete the solubilization of any residual uranium and to oxidize all the niobium oxides to insoluble hydrated niobic acid ($Nb_2O_5 \cdot H_2O$). This third aqueous solution is moved through a second separator. The aqueous solution is returned to the second container for repeated usage. The insolubles in the second separator are transferred to a cold furnace and the temperature is elevated to 1100° F. The dried product is niobium pentoxide ($Nb_2O_5$).

An aqueous solution containing HCl, $HBF_4$, $U^{+4}$, and $Cl^-$ from the first separator combined with hydrofluoric acid (HF) either in aqueous solution or gaseous form and green salt ($UF_4$) is therefore precipitated out of that solution. To encourage such precipitation the hydrofluoric acid may be stirred into the aqueous solution. An aqueous solution containing hydrochloric and fluoboric acids results, and that solution and the green salt precipitate it contains are moved, typically to a third separator for separating the green salt from the aqueous solution. The aqueous solution is then returned to the beginning of the system where the acid content of the solution may be analyzed. Water, hydrochloric acid and/or fluoboric acid may be added to bring those constituents to approximately the level of the beginning solution. This aqueous solution may be utilized as, or in combination with, the original aqueous solution to dissolve successive loads of alloy pieces.

The green salt is washed with water to reduce impurities and is at least partially dried. It may then be removed from the separator means and stored in drums or similar containers. Eventually, the green salt may be further dried and employed in magnesium reduction processing to make uranium (metal derby). The recovery of uranium as its tetrafluoride is disclosed in U.S. Pat. Nos. 4,699,769 and 4,837,375, which are incorporated herein by reference.

The following example is provided to illustrate the quantities of materials and chemicals and the times which may be employed in the process of this invention. These values, however, are provided for illustrative purposes only. The process of this invention is limited only by the claims.

The beginning aqueous solution may include 80 gallons of water, 20 gallons of hydrochloric acid and 2.5 gallons of fluoboric acid. To this solution 100 pounds of oil-free uranium-niobium alloy scrap may be added at a rate which limits the exothermic reaction temperature to 180° F. The pieces are added until dissolution is complete.

Two gallons of sludge containing insoluble uranium and niobium oxides are separated from the solution and then reacted with ten gallons of nitric acid of 50% concentration until the niobium oxides are precipitated out of the sludge as niobic acid, a white crystalline substance. A filter then traps the niobic acid and passes the nitric acid with dissolved uranium for further treatment and/or reuse. The niobic acid is dried at typically 1100° F. to yield niobium pentoxide. Seven gallons of hydrofluoric acid having a concentration of 49% may be added to the filtrate of the starting solution including the dissolved uranium alloy. The solution is stirred for five minutes until the green salt ($UF_4$) has completely precipitated out of solution. After separation of green salt, the solution is analyzed for losses in hydrochloric acid and water. The required amount of each is added to bring the solution to a level of 100 gallons and an approximately 20% concentration of hydrochloric acid. The solution may then be recycled for use in dissolving an additional 100 pounds of uranium and/or uranium alloy scrap. Recycling may be continued until impurities reach undesirably high levels. Those levels may vary according to the intended uses for the recycled green salt. A small amount of the original solution may be disposed of before it is recycled to maintain the impurity level within the desired limits.

There is shown in FIG. 1 a system 10 for removing niobium from uranium/niobium alloy. Uranium/niobium alloy wastes, such as from machining or other processes, are first degreased in step 12. The oil-free pieces are then dissolved in step 14 in water, hydrochloric acid and fluoboric acid. This yields a solution including $U^{+4}$, $Cl^-$, $H^+$ niobium oxide, uranium oxides and fluoboric acid. The niobium oxides are then separated in step 16, after which they are reacted in step 18 with nitric acid and water. This yields a solution of hydrated niobium pentoxide (niobic acid), $U^{+6}$, nitric acid and water. This solution is separated in step 20 using a water wash. The wash water is discarded, the $U^{+6}$, nitric acid and water are recycled back to step 18 and the hydrated niobium pentoxide is submitted in step 22 to heat of approximately 1100° F. to drive off the water and yield the final niobium pentoxide product.

When the niobium oxides are separated in step 16, the residual solution, $U^{+4}$, $Cl^-$, $H^+$ and fluoboric acid were precipitated in step 24 using hydrofluoric acid to obtain a solution of green salt, $Cl^-$, $H^+$, and fluoboric acid. This solution is separated in step 26 using wash water to yield hydrated green salt and water. In step 28 the green salt is air-dried at a temperature of approximately 400° F. to yield hydrated green salt, $UF_4 \cdot nH_2O$, which is further treated, step 30, by exposure to an inert gas at approximately 1400° F. to yield the final product of dried green salt, $UF_4$.

The method 10 may be executed with apparatus shown in system 50, FIG. 2. The uranium/niobium alloys are combined with water, hydrochloric acid, and fluoboric acid, in a container or vessel 52. The reaction gives off free hydrogen and produces a solution of $U^{+4}$, niobium oxides, uranium oxides, $Cl^-$, $H^+$ and fluoboric acid, which are submitted to separator 54. One output of separator 54 yields the niobium oxides and the uranium oxides which are delivered to a second container or vessel 56, where they are combined with recycled solution of nitric acid, $U^{+6}$ and water, along with sufficient additional nitric acid to maintain the proper concentration. This reaction results in a solution containing hydrated niobium pentoxide, nitric acid, $U^{+6}$ and water, which is submitted to a second separator 58 along with wash water. Separator 58 produces hydrated niobium pentoxide and water which is submitted to furnace 60, where it is air-dried at approximately 1100° F. to produce niobium pentoxide. Separator 58 also produces the recycled solution of nitric acid $U^{+6}$ and water, which is fed back to vessel 56.

The second output of the first separator 54 produces a solution including $U^{+4}$, $Cl^-$, $H^+$, fluoboric acid and water, which is delivered to a third tank or vessel 62 along with a separate input of hydrofluoric acid. This yields a solution including green salt, hydrochloric acid, fluoboric acid and water, which is submitted to a third separator 64. One product of separator 64 is green salt and water, which is air-dried in oven 66 at approximately 400° F. to yield hydrated green salt, $UF_4 \cdot nH_2O$, which is submitted to furnace 68 where it is dried at 1400° F. in an atmosphere of inert gas to yield green salt, $UF_4$. The other output of separator 64 recycles hydrochloric acid, fluoboric acid and water back to the original container or vessel 52 so that it can be re-used.

The first vessel 52 may be a conventional reaction tank. A preferred tank is supplied by Perry Products Corp. The separators may include a press filter such as the JWI Filter Press Model 470, a centrifuge, or other such solid/liquid separation apparatus. Typically the second container 56 is a filtrate tank such as that supplied by Perry Products Corp. Conventional pumps may be employed to move the solutions between the containers and separator means, but have been omitted for clarity.

The apparatus disclosed is only one example of an apparatus which may be used to practice this invention. The invention is not limited to the illustrated apparatus and may be practiced on various alternative apparatuses. Although specific features of the invention are shown in some features and not others, this is for convenience only as each feature may be combined with any or all other features in accordance with the invention.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method of removing niobium from a uranium-niobium alloy comprising:
   dissolving the uranium-niobium alloy metal pieces in a first aqueous solution containing an acid selected from the group consisting of hydrochloric acid and sulfuric acid and fluoboric acid as a catalyst to provide a second aqueous solution, which includes uranium ($U^{+4}$), acid radical ions, the acids insolubles including uranium oxides and niobium oxides;
   adding nitric acid to the insolubles to oxidize the niobium oxides to yield niobic acid and to complete the solubilization of any residual uranium; and
   separating the niobic acid from the nitric acid and solubilized uranium.

2. The method of claim 1 further including drying the niobic acid to obtain niobic pentoxide.

3. The method of claim 2 in which the niobic acid is dried at approximately 1100° F.

4. The method of claim 1 in which said acid selected from the group consisting of hydrochloric acid and sulfuric acid is 3 normal (25%).

5. The method of claim 1 in which said first aqueous solution contains hydrochloric acid and fluoboric acid.

6. The method of claim 1 in which said first aqueous solution contains hydrochloric acid and fluoboric acid.

7. The method of claim 1 in which said fluoboric acid has a concentration of 0.5-5%.

8. The method of claim 1 in which said nitric acid concentration is approximately 50%.

9. The method of claim 1 in which said separating includes filtering.

* * * * *